June 19, 1956     A. FREEMAN     2,751,091
CONVEYOR SYSTEMS
Filed June 19, 1952     4 Sheets-Sheet 1
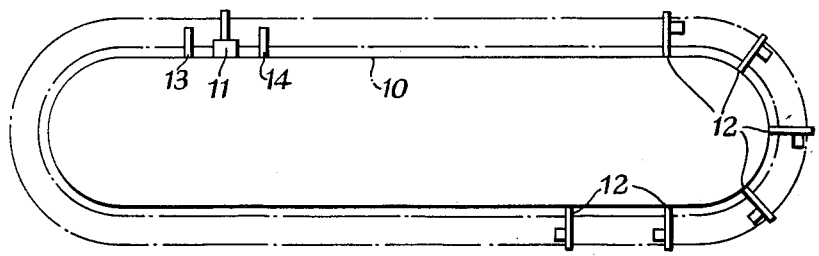
Fig.1.
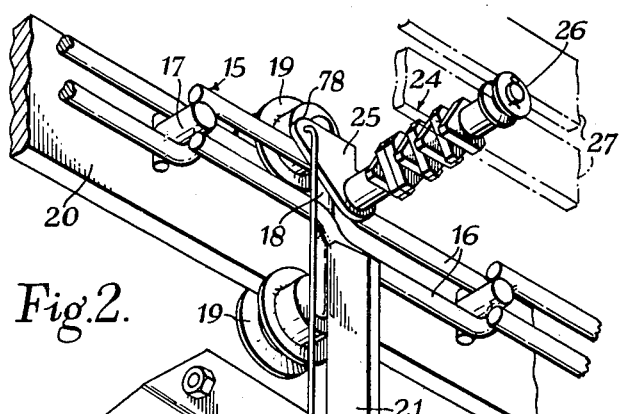
Fig.2.
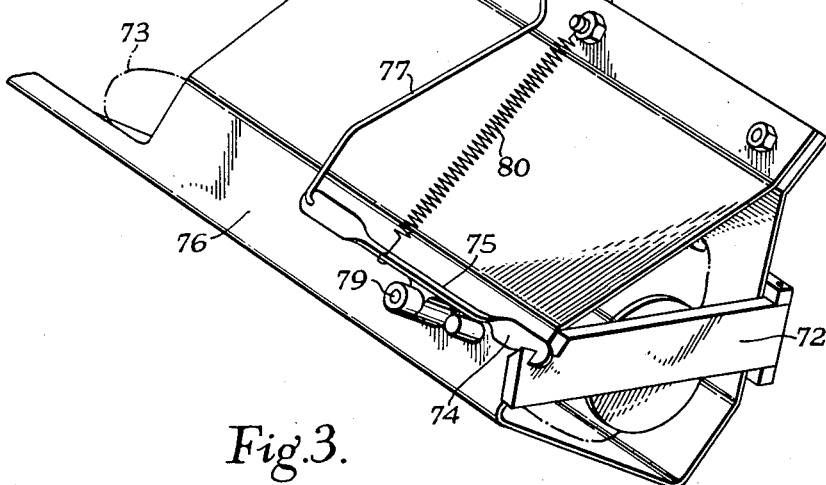
Fig.3.
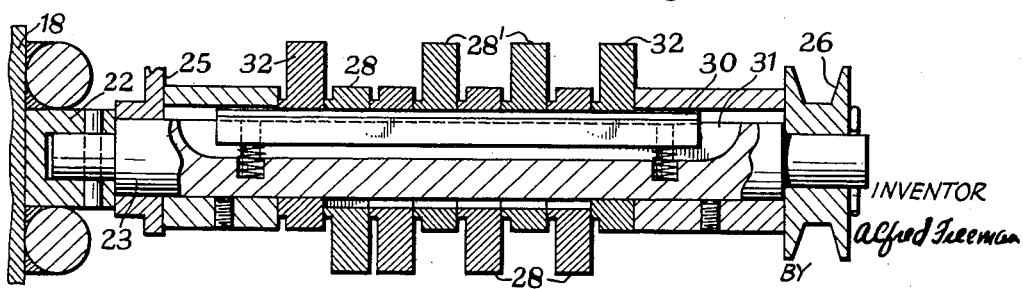
INVENTOR
Alfred Freeman
BY
Jerome W. Payton June 19, 1956 — A. FREEMAN — 2,751,091

CONVEYOR SYSTEMS

Filed June 19, 1952 — 4 Sheets-Sheet 2

INVENTOR
Alfred Freeman
BY

June 19, 1956 A. FREEMAN 2,751,091
CONVEYOR SYSTEMS
Filed June 19, 1952 4 Sheets-Sheet 3

INVENTOR
Alfred Freeman
BY

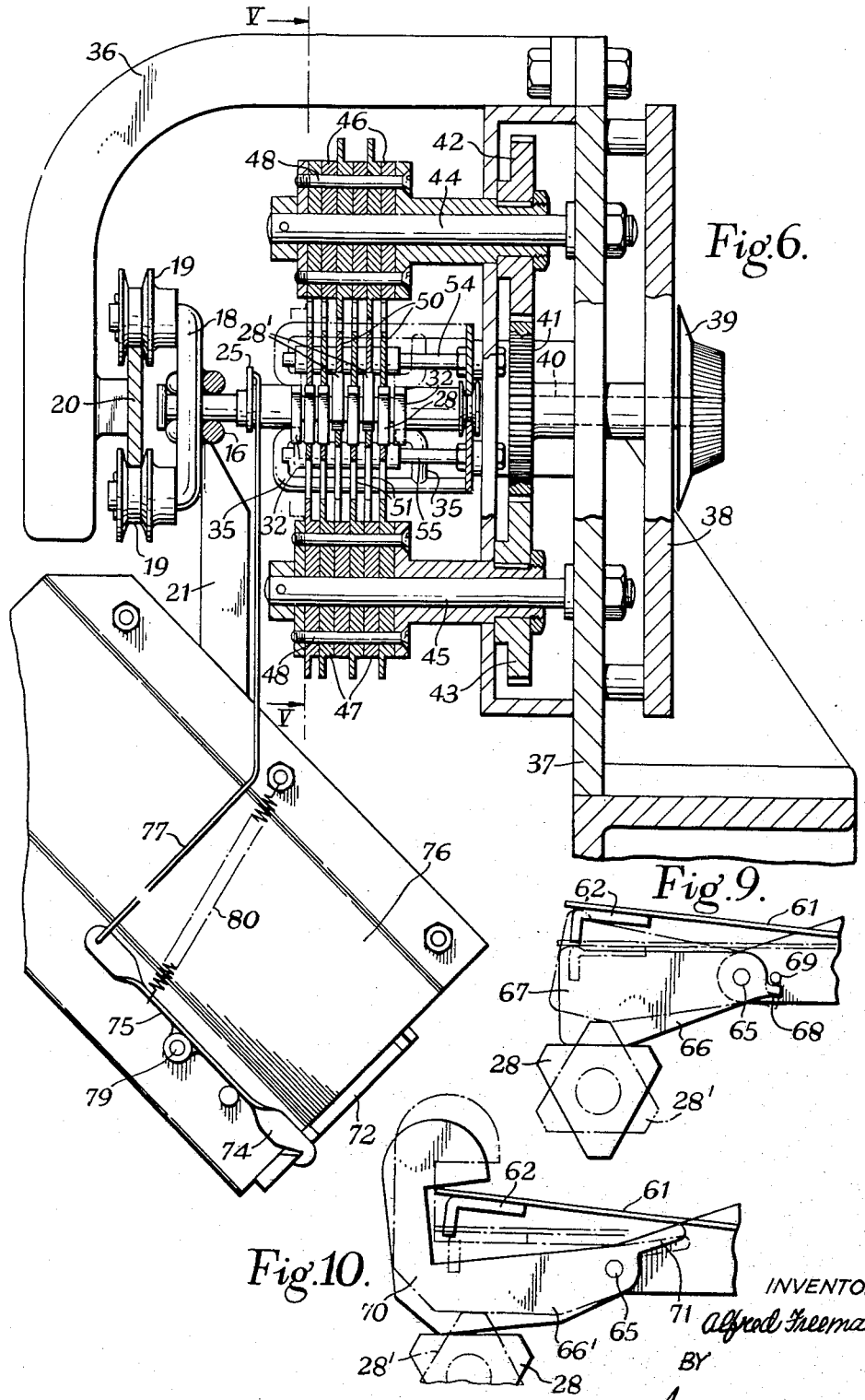

United States Patent Office 2,751,091
Patented June 19, 1956

2,751,091

CONVEYOR SYSTEMS

Alfred Freeman, Isham, near Kettering, England

Application June 19, 1952, Serial No. 294,400

Claims priority, application Great Britain June 21, 1951

9 Claims. (Cl. 214—11)

The present invention is concerned with conveyor systems by means of which goods can be transported away and delivered automatically at a predetermined place along the system, e. g. as selected by the loader.

As will be apparent, such systems can find numerous and varied application in the sorting or grading of articles or goods, for example, in accordance with size and/or other characteristics. For the sake of simplicity we shall hereinafter describe it in connection with the sorting of lasts in the boot and shoe industry, but emphasize that the principles involved—and in many instances the practical details disclosed below—can be applied with appropriate but not fundamental modifications, to a wide variety of other uses.

Generally stated, then, the system of this invention comprises a conveyor system for the dispatch of goods from one station to a selected other station, such system comprising a conveyor, carriers for goods secured, or adapted to be secured, on said conveyor, an index device associated with each said carrier and arranged to extend transversely of the length of the conveyor, this index device comprising a plurality of index elements alternatively movable into a projected or a non-projected position, at least one index-setting mechanism for setting the elements of the index devices to a selected condition, and a plurality of discharge devices for operation by respectively approved settings on the index devices to cause discharge of the goods from the conveyor.

The general principle therefore is that in using a system according to this invention, the details of which can take many forms other than those particularly described below, a loader will place the goods to be moved in a carrier on the passing conveyor, or place an already-loaded carrier on the conveyor, set the corresponding index device, which may be on the conveyor or the carrier, e. g. by means of a dial on a fixed index-setting device, to the discharge station of his choosing, and the goods will be discharged at this station.

Various features of the invention will be disclosed in the following description and in the ensuing claims.

One form of conveyor system according to this invention will now be described by way of illustration. This particular form is dedicated to the sorting of lasts in a boot and shoe factory, but it is to be understood that it is capable, with modifications of detail only, of being employed for many other varied uses.

In the drawings:

Figure 1 is a diagram indicating in a very general way the layout of the system.

Figure 2 is a perspective view illustrating part of the conveyor chain and track used in the system, and also a form of last carrier and index device.

Figure 3 is an enlarged vertical section through the index device seen in Figure 2.

Figure 6 is another view of this mechanism, being a section on the line VI—VI of Figure 5.

Figure 9 shows a detail of one of the levers of this discharge device, whilst

Figure 4:
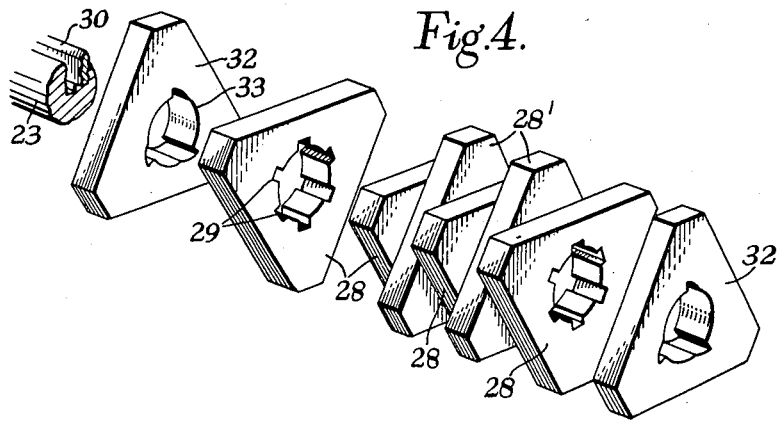
Figure 4 is an exploded perspective view of the elements of this index device.

Figure 10 similarly illustrates a second form of lever also used in the device.

The aim of the system now to be described is to enable an operative "slipping" shoes from the lasts at an appropriate point in the manufacturing line, usually when the shoes are finished, to despatch these lasts to points where they will be collected according to a particular characteristic, generally shoe styles. This avoids the current procedure of throwing the slipped lasts into a bin which has then to be taken away by another attendant, sorted into boxes or "cubs" by hand, and then the cubs stacked in their particular racks. As will be readily appreciated, an automatic discharge only of lasts of a specific style at each of a number of stations in a circuit avoids the need for this hand sorting, and eliminates much carrying of bins and cubs, therefore minimising the manual labour involved.

Referring first to Figure 1 of the drawings, the system comprises an endless conveyor, generally denoted 10, which is arranged to circulate in a closed path passing through a loading station 11 and a number of discharge or unloading stations, schematically represented at 12, along the path of travel of the conveyor. The general principle is that the conveyor shall be loaded at station 11 by placing the lasts in passing carriers on the conveyor, and an index associated with each of the respective carriers shall be set by the loader to the combination of projections and retractions, using an index setting mechanism provided at station 11, corresponding to the discharge station dedicated to a particular last size and/or "style." Consequently when, in the course of their travel around the circuit, each of the index devices meets a discharge device responsive to its particular setting, the carrier concerned will be operated to discharge the last into a chute or other means leading to an appropriate receptacle.

In Figure 1 we have diagrammatically indicated at 13 and 14 means which are respectively used for unlocking the index device for setting at 11 and for re-locking the elements in their set condition.

Figure 2 illustrates the form of the conveyor, the index device and the last carrier, in more detail. Hence, the conveyor comprises an endless chain made up of a series of links 15 having one of the forms disclosed in our co-pending application No. 14,758/51, i. e. comprising a pair of spaced arms 16 with a headed pin 17 at one end for engaging slidingly in the gap between the spaced arms 16 of the adjacent link. The two arms 16 are cranked at their central part, where the link is provided with a transverse rod 18 supporting at its outturned ends wheels 19 which are arranged to run on the upper and lower edges of a track formed by a supporting and guide bar 20. The wheels or runners 19 are arranged for a small degree of axial shifting along the outturned ends of rod 18 to allow for "cornering" of the chain and, by virtue of the particular formation of the links, the guide 20 can be curved upwardly or downwardly in its longitudinal direction, or can deviate laterally, without jamming of the conveyor.

Secured to, and extending downwardly from, the rod 18 is a bar 21 supporting a last carrier as will be more specifically described hereafter. The rod 18 also has, secured to its upper part, a laterally extending element 22 which serves to carry one end of an arm 23 forming part of the transversely-extending index device generally designated 24. This arm has, disposed therearound at its inner end, a plate 25 forming part of the release mechanism of the last carrier, as will be more fully referred to hereinafter.

On the outer end of the arm 23 is a runner 26 intended, at the index setting location and at each of the discharge stations, to cooperate with a guide, such as indicated at 27 in Figure 2, to bring the index device into a correct horizontal position for the setting or reading of the combination of projections thereon. The index arm 23 also has threaded thereon six tumblers 28 of flat triangular section which represent the index elements referred to above.

As will be observed from Figure 4 of the drawings, each of these tumblers is centrally apertured for threading on the arm 23 and is provided internally with six equally-spaced notches 29 which serve for the reception with the edge of a locking strip 30 mounted in a slot 31 in the arm 23 and spring pressed outwardly (see Figure 3). When so accommodated in the notches 29, the strip serves to key the elements against rotational movement on arm 23, and it will be noted that the notches are so rotationally arranged around each tumbler that they correspond either to a position of the latter in which a flat edge or an apex of the tumbler is uppermost.

Figure 5:
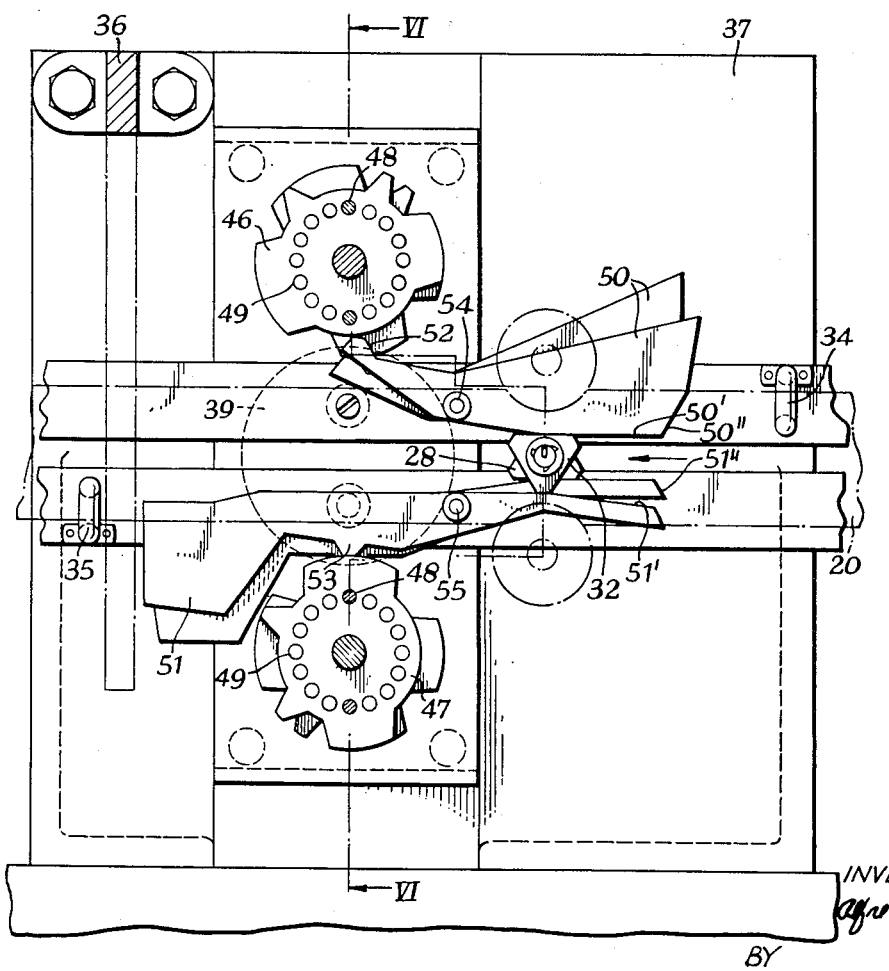
Figure 5 is a side elevation of parts of an appropriate index-setting mechanism which can be employed in the system, as seen on the line V—V of Figure 6, looking in the direction of the arrows.
Figure 7:
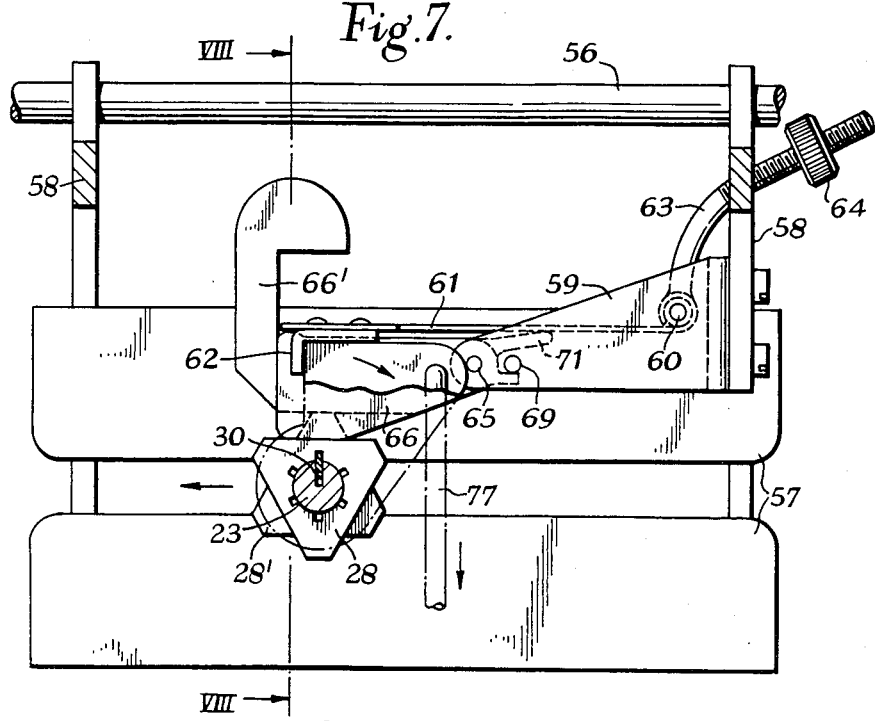
Figure 7 is a side view of the same index device, set by the mechanism of Figures 5 and 6, as it enters and operates a correspondingly-prepared discharge device in the system. This view is taken on the line VII—VII of Figure 8.
Figure 8:
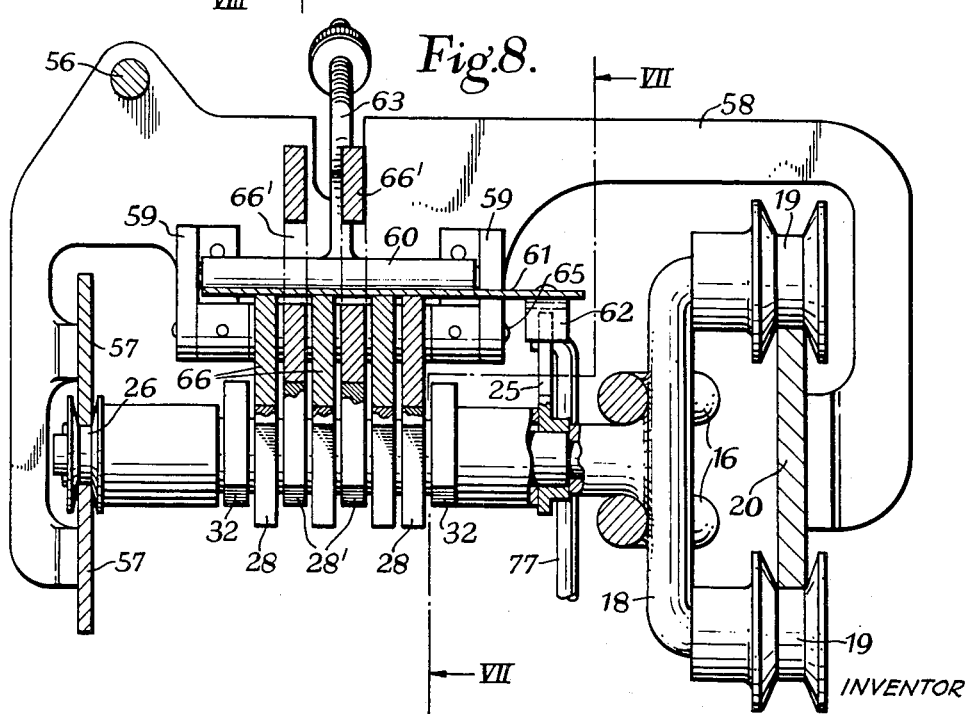
Figure 8 is an end view of the discharge device seen in Figure 7, partly in section on the line VIII—VIII of Figure 7.

To control the projection and retraction of the strip 30 in this way, the index device is provided at each end of the six elements 28 with a further triangular locking and unlocking tumbler 32 which has, as will be seen from Figure 4, some three cam surfaces 33 extending outwards from its central aperture. Hence, by rotation of the two tumblers 32 through 60°, i. e. by moving the tumbler 32 concerned from a side-uppermost to an apex-uppermost position or vice versa, the strip 30 will be allowed to project in its locking position or retracted to unlock the elements 28 for setting. Such depression or release of the strip is effected by means of pairs of abutments 34 and 35 respectively which are mounted in appropriate locations on either side of the index setting mechanism seen in Figures 5 and 6.

This mechanism comprises a bracket 36 supported by a fixture 37 and overhanging the conveyor at the index setting or loading station. The fixture 37 is provided with a front plate 38 on which is arranged an indicator dial 39 keyed to a spindle 40 having a gear wheel 41 at its outer end meshing with corresponding gears 42 and 43 at its upper and lower sides. The gear wheels 42 and 43 are in turn respectively connected to a shaft 44 and 45 extending inwards above and below the path of travel of the index devices, and each carries a cam drum made up of a pack of plate-form edge cam discs 46 and 47 corresponding in number and position to the tumblers 28. All the cam discs 46 and 47 are of like form, but are arranged in relatively staggered fashion on their respective shafts to produce a series of staggered cam faces as is seen more clearly from Figure 5. Bolts 48 passing through a series of registering apertures 49 in the various cam discs serve to lock the latter adjustably in a pack.

Associated respectively with each of the cam discs 46 and 47 is a corresponding finger 50 or 51, these being in sets on common transverse spindles 54 and 55. The form of these fingers is seen more particularly from Figure 5, from which it will be observed that the fingers are each formed with a nose, 52 and 53 respectively, cooperating with the profiled edge of the corresponding cam disc, and that the fingers are weight-biassed against the respective discs.

The arrangement is that, after passing the abutment 34 and thus being in the unlocked condition, the tumblers 28 are introduced between the arms 50 and 51. The cam drums 46 and 47 are arranged so that when a lever nose 52 is disposed in a recess in corresponding cam 46, the nose 53 is in contact with a raised part of the edge of the opposing disc 47, and vice versa. Consequently the lower edge 50' at the forward end part of finger 50 and the upper edge 51' of the forward end part of finger 51 will be simultaneously lifted or lowered, i. e. in one of the two positions indicated in Figure 5.

Hence a tumbler 28 entering the mechanism already in the required apex-up or down, i. e. projected or retracted, condition will simply pass without obstruction, whilst one requiring re-setting will abut against one of the chamfered surfaces 50" or 51" at the leading end of the corresponding fingers and be orientated into the desired position.

The passing index device will therefore leave the index setting mechanism with the required combination of tumbler sides and apexes uppermost, as determined by the loader in rotating the dial 39, and will be locked in this condition by the intervention of the abutments 35. In the particular instance under review it is assumed that two of the tumblers 28' leave with their apexes "up," the remainder being down.

A form of mechanism which can be used at the discharge station will now be described with reference to Figures 7 to 10 of the drawings. Here again, the device is mounted on a pair of frames 58 each in the form of a bracket, these being secured to a fixed support 56 and straddling the path of the conveyor moving along its track 20. The frame 58 has a guideway 57 for the end wheel 26 of the passing index devices and a pair of forwardly projecting arms 59 between which is mounted a spindle 60 forming the pivot for a forwardly extending plate 61 carrying, at its leading end, a downturned catch 62 for opening the last carrier. The spindle 60 has an upwardly and rearwardly extending arm 63 on which is threaded an adjustable counterweight 64.

Mounted on a further transverse spindle 65 at the forward ends of the arms 59 are a set of rockable levers 66, 66', corresponding in number and position to the path of travel of the respective tumbler elements 28 and 28'. These levers are of two different forms, as seen at 66 and 66' in Figures 9 and 10, the use of particular levers 66 and 66' in the respective locations of the set determining the combination of tumbler settings which will be effective to trip the last carrier release mechanism when the index device passes this station.

As will be observed from Figures 9 and 10, the levers 66, which are identical with one another, are each of generally triangular form but with a relatively enlarged leading end 67 which is effective, when contacted by an upstanding apex of a passing tumbler 28, to be applied against a plate 61 thereby to lift catch 62 into a raised and inoperative position. On the other hand, if the leading end portion of a lever 66 is met by a horizontal side of the corresponding tumbler 28, the lever pivots forwardly and downwardly and is then capable of allowing the plate 61 to rock downwards to bring its catch 62 into the operative position. A heel 68 on each lever 66 cooperates with a cross pin 69 to limit this forward dropping movement.

As regards the elements 66', it will be noted that, at their operative ends, i. e. at the part designated 70 in Figure 10, they are of smaller height than levers 66, but are provided with a rearwardly extending tail 71, on the other side of the pivot 65 which is adapted, when the lever 66' tips forwards, to abut against plate 61 and lift it, thus moving catch 62 into the inoperative position. The latter will, in fact, only be allowed to descend into the operative position when the operative end 70 of lever 66' is raised by contact with a passing apex uppermost tumbler, as indicated by the dotted lines in Figure 10.

Hence, with the use of levers 66 and 66' as described and illustrated, the catch 62 will only be allowed to drop forwards into its tripping position when the exact combination of "ups" and "downs" passes on an index mechanism. If any tumbler is not correspondingly orientated, then the result will be to lift the catch 32 out of the way and allow the last carrier to pass unmolested.

Finally, such carrier (see Figures 2 and 6) is made of open-ended, generally triangular shape and has a pivotal bar 72 disposed across the open lower side thereof normally to retain a last 73 in position in the carrier. At its free end the bar 72 is notched and cooperates with a retaining catch 74 at the end of a lever 75 centrally pivoted at 79 on a wall of the carrier body 76 and connected through a cranked rod 77 at its other end to the nose 78 of the trip catch 25 mounted on the arm 23 of the index device associated therewith.

At this side of the pivot 79, the arm 75 is biased by a tension spring 80. Hence, when the nose 78 abuts against a lowered trip catch 62 in passing through a discharge device, the rod 77 is depressed against the action of spring 80 so as to disengage the catch 74 from bar 72 thereby opening the bottom of the carrier and dumping the last.

As has been stated, the means described can take varied forms. To mention a few only:

(a) The carriers can be provided separately of the conveyor and the index devices then either secured on the conveyor or on the carriers.

(b) The discharge mechanism could be capable of electrical, instead of mechanical, operation by the passing set index devices.

(c) Instead of employing a wheel such as 26 to ensure the horizontal position of the index arm at the various vital points, the bar 20 itself could, at these points, be outwardly enlarged to take up the axial play of runners 19 and so ensure the required horizontal positioning.

What I claim is:

1. A conveyor system comprising a conveyor; means for mounting goods to be carried on said conveyor; a plurality of index devices located in use transversely of the conveyor to travel therewith, each said index device comprising a plurality of index elements each individually movable alternatively into a projected or non-projected position, whereby each index device is selectively set to a specific operative combination of projected and non-projected elements; and a plurality of trip devices at stations along the path of said conveyor, each of said trip devices comprising a frame, a set of control elements mounted on said frame in the path of the projected corresponding elements of a passing index device, and a tripping member pivoted to said frame and movable out of its tripping position by abutment with any one incorrectly-disposed control element.

2. A conveyor system comprising a conveyor; means for mounting goods to be carried on said conveyor; a plurality of index devices projecting in use laterally of said conveyor to travel therewith, each said index device comprising a plurality of index elements each individually settable alternatively in a projected or non-projected position, whereby each index device is selectively set to a specific operative combination of projected and non-projected elements; and a plurality of trip devices at stations alongside the conveyor circuit, each of said trip devices comprising a frame, a set of control elements pivoted on said frame across the path of the travelling index devices, with each control element in the line of travel of one index element, and a tripping member pivoted on said frame and bearing against said control elements, each of said control elements being adapted, when brought into an unauthorized angular position by the corresponding index element, to abut against and move the tripping member into non-tripping position.

3. A conveyor system comprising a conveyor; means for mounting goods to be carried on said conveyor; a plurality of index devices located in use transversely of said conveyor to travel therewith, each said device comprising a support extending laterally from the conveyor, a plurality of index elements mounted side by side on said support and individually movable alternatively into a projected or non-projected position relatively to said support, and common means for holding all the index elements in their selected positions, whereby each index device is selectively set to a specific operative combination of projected and non-projected elements; and a plurality of trip devices at stations along the path of said conveyor, each of said trip devices comprising a frame, a set of control elements mounted on said frame in the path of the projected corresponding elements of a passing index device, and a tripping member pivoted to said frame and movable out of its tripping position by abutment with any one incorrectly-disposed control element.

4. A conveyor system comprising a conveyor; means for mounting goods carriers on said conveyor; an index device associated with each said carrier, said index device comprising an arm extending laterally from the conveyor, a plurality of index elements in the form of tumblers which are apertured and threaded side-by-side on said arm, these index elements being adjustable between a projected and non-projected position, and a locking strip displaceable in said arm and movable through notches in said index elements to lock them in a selected combination of projected and non-projected elements; and a plurality of trip devices at stations along the path of said conveyor, each of said trip devices having means positively responsive to the setting of all the index elements of an oncoming index device alternatively to initiate a trip action or to prevent such initiation.

5. A conveyor system comprising a conveyor; means for mounting goods carriers on said conveyor; an index device associated with each said carrier, said index device comprising an arm extending laterally from the conveyor, a plurality of index elements in the form of tumblers which are apertured and threaded side-by-side on said arm, these index elements being adjustable between a projected and non-projected position, a locking strip displaceable in said arm and movable through notches in said index elements to lock them in a selected combination of projected and non-projected elements, and end locking tumblers on said arm, each end locking tumbler having a cam surface for displacing said locking strip; and a plurality of trip devices at stations along the path of said conveyor, each of said trip devices having means positively responsive to the setting of all the index elements of an oncoming index device alternatively to initiate a trip action or to prevent such initiation.

6. A conveyor system comprising a conveyor; means for mounting goods to be carried by said conveyor; a plurality of index devices set to identify the respective goods and disposed in use transversely of the conveyor to travel therewith, each said index device comprising a plurality of index elements each individually movable alternatively into a projected or non-projected position; at least one index setting mechanism comprising two drums positioned respectively above and below the path of travel of the index devices, each drum being composed of a plurality of side-by-side cams, pivoted fingers applied one against each of said cams and pivotable by rotation of the latter into one of two alternative positions in which it cooperates with a corresponding index element of a passing index device to determine either a projected or non-projected position for this index element, and means for rotating said drums in unison; and a plurality of trip devices at stations along the path of said conveyor, each of said trip devices having means positively responsive to the setting of all the index elements of an oncoming index device alternatively to initiate a trip action or to prevent such initiation.

7. A conveyor system comprising a conveyor; means for mounting goods to be carried on said conveyor; a plurality of index devices located in use transversely of the conveyor to travel therewith, each said index device comprising a plurality of index elements each individually movable alternatively into a projected or non-projected position, whereby each index device is selectively set to a specific operative combination of projected and non-projected elements; and a plurality of trip devices at stations along the path of said conveyor, each of said trip devices comprising a spindle extending transversely of the run of the conveyor, a plurality of levers disposed side by side and loosely threaded on said spindle, each said lever being disposed above the path of the corresponding index element for control by the latter, and catch means controlled by said levers, said catch means being movable into an operative position to trip release means on a passing carrier in response to a pre-selected setting of a passing index device.

8. A conveyor system comprising a conveyor; means for mounting goods to be carried on said conveyor; a plurality of index devices located in use transversely of the conveyor to travel therewith, each said index device comprising a plurality of index elements each individually movable alternatively into a projected or non-projected position, whereby each index device is selectively set to a specific operative combination of projected and non-projected elements; and a plurality of trip devices at stations along the path of said conveyor, each of said trip devices comprising a frame, a spindle on said frame and extending transversely of the run of the conveyor, a plurality of levers disposed side by side and loosely threaded on said spindle, each said lever being disposed above the path of a corresponding index element for control by the latter, and a trip plate pivoted on said frame and having a catch piece, said levers being of two forms, one form having a tail on one side of the common spindle to lift this plate when a retracted index element is encountered, whilst the other has a part at the other side of this spindle which is adapted to lift the plate when a projected index element is encountered.

9. A conveyor system comprising a conveyor; a plurality of last carriers mounted on said conveyor, each last carrier comprising an open-ended holder body, a closure element disposed across one end of said body and hinged to the latter, a latch fastening said closure element, and a release mechanism operatively connected to said latch; an index device secured to and projecting laterally from each last carrier, each said index device comprising a plurality of index elements each individually movable alternatively into a projected or non-projected position, whereby each index device is selectively set to a specific operative combination of projected and non-projected elements; and a plurality of trip devices at stations along the path of said conveyor, each of said trip devices comprising a frame, a set of control elements mounted on said frame in the path of the projected corresponding elements of a passing index device, and a tripping member pivoted to said frame and movable out of its tripping position by abutment with any one incorrectly-disposed control element.

References Cited in the file of this patent

UNITED STATES PATENTS

| | | |
|---|---|---|
| 1,482,311 | Long et al. | Jan. 29, 1924 |
| 1,934,377 | Robbins | Nov. 7, 1933 |
| 1,991,237 | Waite | Feb. 12, 1935 |
| 2,095,552 | Kilcarr | Oct. 12, 1937 |
| 2,427,057 | Knox | Sept. 9, 1947 |

FOREIGN PATENTS

| | | |
|---|---|---|
| 396,635 | Great Britain | Aug. 10, 1933 |
| 531,894 | Great Britain | Jan. 14, 1941 |